US006076026A

United States Patent [19]

Jambhekar et al.

[11] Patent Number: 6,076,026

[45] Date of Patent: Jun. 13, 2000

[54] METHOD AND DEVICE FOR VEHICLE CONTROL EVENTS DATA RECORDING AND SECURING

[75] Inventors: Shrirang Nilkanth Jambhekar, Palatine; Jacques Hara, Glen Ellyn; John Robert Barr, Barrington, all of Ill.

[73] Assignee: Motorola, Inc., Schuamburg, Ill.

[21] Appl. No.: 08/940,541

[22] Filed: Sep. 30, 1997

[51] Int. Cl.[7] .......... G06F 7/00

[52] U.S. Cl. .......... 701/35; 701/117; 340/426; 340/825.31; 340/825.34

[58] Field of Search .......... 701/29, 32, 33, 701/35, 117; 340/426, 428, 459, 825.31, 825.32, 825.34, 901, 991

[56] References Cited

U.S. PATENT DOCUMENTS

| | | | |
|---|---|---|---|
| 5,289,183 | 2/1994 | Hassett et al. | 340/905 |
| 5,311,197 | 5/1994 | Sorden et al. | 342/457 |
| 5,550,738 | 8/1996 | Bailey et al. | 340/459 |
| 5,805,082 | 9/1998 | Hassett | 701/117 |

*Primary Examiner*—William A. Cuchlinski, Jr.
*Assistant Examiner*—Gertrude Arthur
*Attorney, Agent, or Firm*—Darleen J. Stockley

[57] ABSTRACT

A device (100) and method (200, 300) authenticate and secure control event data for a vehicle, wherein the device includes: A) a microcontroller (104), coupled to receive control event information, for attaching a first time stamp and vehicle identification number VIN to the control event information to provide first information and sending the first information to memory (106) in time overlap fashion; B) the memory (106), coupled to the microcontroller (104) and a microprocessor (108), for storing first information and second information in time overlap fashion; and C) the microprocessor (108), coupled to the memory (106) and a plurality of transducers (110), for determining whether received impact data varies from previous impact data, and where received impact data varies, adding a second time stamp and VIN to the received impact data to form second information.

6 Claims, 3 Drawing Sheets

METHOD AND DEVICE FOR VEHICLE CONTROL EVENTS DATA RECORDING AND SECURING

FIELD OF THE INVENTION

The present invention relates to vehicle control events, and more particularly to recording vehicle control events.

BACKGROUND OF THE INVENTION

For aircraft, vehicle control events are recorded and stored in a "black box" that is typically accessed when an accident occurs and is used to determine the cause of the accident. The "black box" is an airline cockpit voice data recorder that records verbal events. This type of recording device has been shown to be extremely useful in determining whether operator error or mechanical failure was the cause of the accident.

For automotive vehicles, however, no authenticated control event recorder has been developed for the purpose of analyzing and evaluating accident claims. When vehicles collide with one another, or are involved in accidents individually, there is no method currently available to determine the sequence of control events performed by the operator before, during and after the occurrence of the accident. Typically police require a report of the accident, but such a report generally relies upon the memories of the operators involved in the accident and any witnesses to the accident. In addition to an investigation by the police, insurance companies for the vehicle or vehicles involved may interview the operator or operators and witnesses to the accident. Often no factual identification of the operator at fault may be determined by the police or the insurance companies.

Thus there is a need for a method and device for authenticating and securing control event data for a vehicle.

DETAILED DESCRIPTION OF A PREFERRED EMBODIMENT

Figure 1:
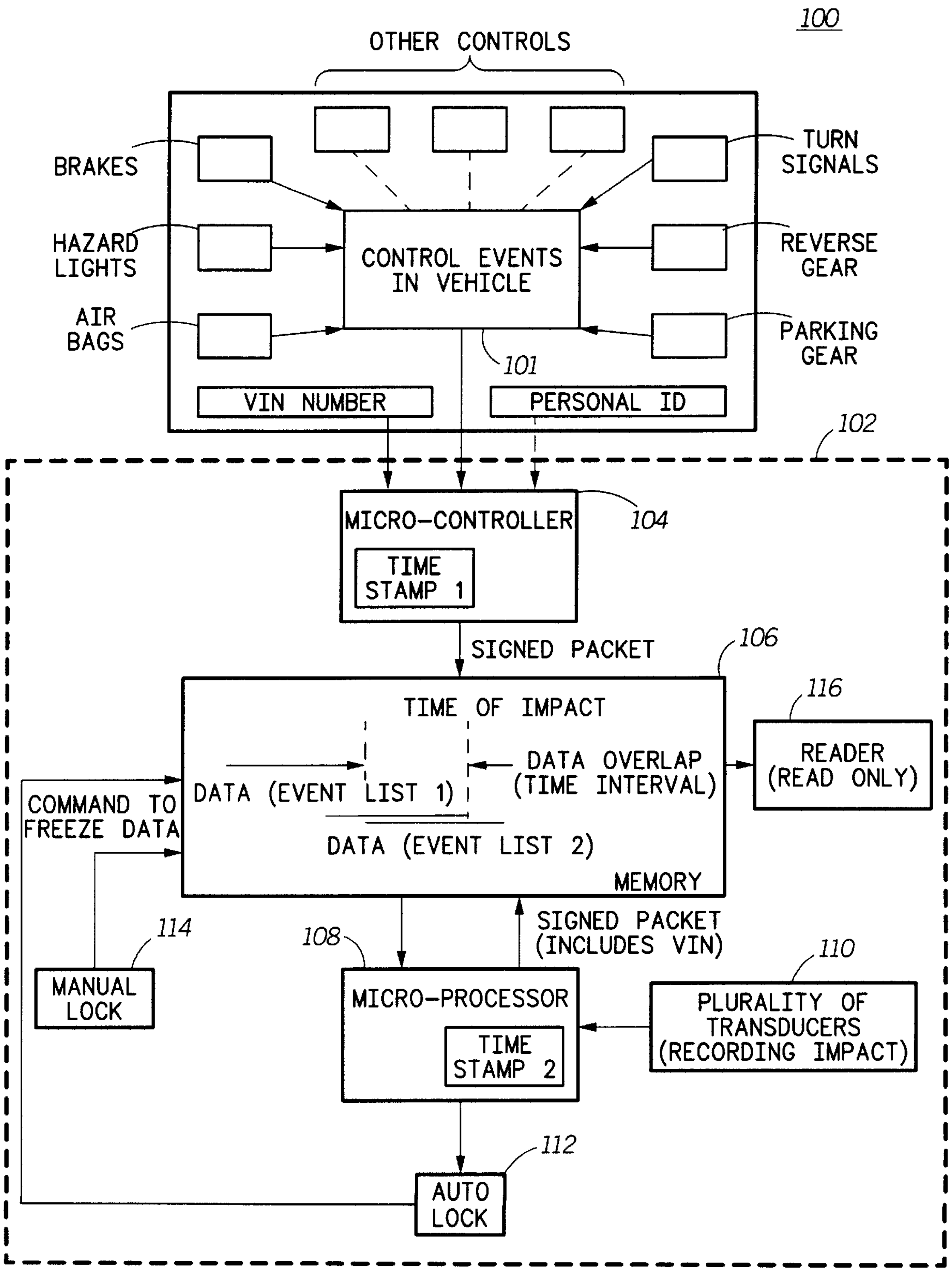
FIG. 1 is a block diagram of a device for authenticating and securing control event data in a vehicle in accordance with the present invention.

The present invention provides a device and method for authenticating and securing event data for a vehicle that may be utilized to analyze the cause of an accident by the police or an insurance agency to aid in their determination as to which driver was at fault, or alternatively, the failure of a vehicle electromechanical system. The method and device may also be utilized to determine whether a false insurance claim has been made. Authenticating event data, as used herein, is defined as ensuring that genuine event data is being recorded by comparing the time stamps on microcontroller data and microprocessor data. Securing event data, as used herein, is defined as limiting access to the stored authenticated event data to certain predetermined agencies. Authenticating and securing the event data provides tamper-proof information about the chronological history of control events.

The present invention records all control events initiated by a driver and a plurality of data with respect to external agents. Data with respect to external agents may include, for example, the force of impact on an external surface of the vehicle body in a crash. Control event data is typically stored in a memory device by a microcontroller and a microprocessor (See FIGS. 2 and 3.). The microcontroller tracks predetermined inputs generated by control events such as turning on a hazard light or engaging a gear in reverse; the microprocessor maintains a record of the relationships between the driver's actions and those feedbacks generated by transducers measuring forces resulting from impacts (for example, impacts on bumpers, panels, doors, activation of airbags, etc. on impact in an accident). Data is stored on a first-in-first-out basis. If no impact occurs within a predetermined time period that is selected to maintain data storage within the limits of the memory, previous control information and data are simply overwritten. Alternatively, initialization of memory (i.e., deletion of stored data) may be initiated by an authorized user. An authorized user is typically a member of an insurance agency or the like. In case of impact, the memory record is secured in the memory device either automatically on registering the impact or, if the option is permitted, may be secured manually by the driver.

The events recorded by the microcontroller are "signed" by the microcontroller, i.e., include a time stamp and predetermined identification value/values to ensure that the recorded events were produced during the operation of the specific vehicle. Thus, data provides information for the microprocessor to compare with its own signed data to determine whether the microcontroller data is genuine. For example, one predetermined identification value is a vehicle identification number (VIN) of the vehicle being driven. The VIN is recorded along with the event information to identify the vehicle uniquely. Event information includes data with respect to impacting transducers and control event information and any other predetermined data collected. The vehicle may also support a recognition mechanism and a driver preference mechanism that allows determination of who was driving the vehicle during the signed period. The microprocessor has its own time stamp mechanism that is associated with the external impact sensors. The combination of the event recording and the impact sensing time stamps may be used to certify that the events were recorded at the time of the accident.

The secured record of events is then securely accessible to agencies like automobile insurance agencies or police agencies. The agencies may then analyze the data by securely accessing the memory device, retrieving and interpreting the secure records. Since only the insurance agencies and the police agencies will have access to the secure records, the accident claims may be monitored securely. The police agencies may use the secure event data to determine the cause of the accident and identify the party at fault.

Information stored on the memory device includes a dual record with a time phase difference to produce records overlapping by a predetermined amount. In this way when the first record is being erased, and an accident occurs at the same time, the initial portion of the out-of-phase record is still available. A cumulative record is not generally possible since an unlimited amount of memory would be required, and a large portion of the record prior to an impact would typically not be helpful. In one embodiment, the event data is only accessed securely, using encryption and public key cryptography. The access mechanism may be implemented using a smart card. A smart card may be used as a mechanism to store the certified data that can be removed from the vehicle to be further processed remotely. The smart card acts as a standardized, modular, portable/removable device of convenience to the accessing authorized agencies. A smart card contains a certifiable key only known to the authorized agencies that can be authenticated by the microprocessor against public keys for those authorized agencies.

A secure mechanism may include deliberately setting the microprocessor time clock out of phase with the microcontroller time clock at a predetermined interval. That out of phase value is known only to the system setting of the microprocessor.

In one embodiment, the event record may be transmitted to a remote location (e.g., insurance agencies and police agencies) by use of a cellular phone or similar radio by sending out the event data utilizing a secure method. If a radio frequency device exists on the vehicle, the microprocessor can be programmed to call an authorized agency databank which will provide certifiable keys only known to the authorized agency that can be authenticated by the microprocessor against public keys for selected authorized agencies. Secure protocol can be used to prevent unauthorized reception of the event record.

The components of the present invention may be embodied as a contacted/contactless smartcard module that is readable through a smart card reader. Alternatively, the components may be embedded in the electronics of an automobile. For example, the components may be embodied as a unified device, a combination of a microcontroller and a microprocessor module in a single integrated circuit integrated with both input/output and memory components. A third alternative uses a secure memory and a software program that enables use of existing microelectronics in the vehicle. The software functions in accrodance with the method described below in FIG. 2.

FIG. 1, numeral 100, is a block diagram of a device for authenticating and securing control event data in a vehicle in accordance with the present invention. The device includes: A) a microcontroller, coupled to receive control event information, for attaching a first time stamp and vehicle identification number VIN to the control event information to provide first information and sending the first information to memory in time overlap fashion; B) the memory, coupled to the microcontroller and a microprocessor, for storing first information and second information in time overlap fashion; and C) the microprocessor, coupled to the memory and a plurality of transducers, for determining whether received impact data varies from previous impact data, and where received impact data varies, adding a second time stamp and VIN to the received impact data to form second information.

The device typically also includes an auto-lock unit coupled to the microprocessor for sending a signal to the memory to lock the first information and the second information in unchangeable form, or alternatively, a manual lock for sending a signal to the memory to lock the first information and the second information in unchangeable form.

Figure 2:
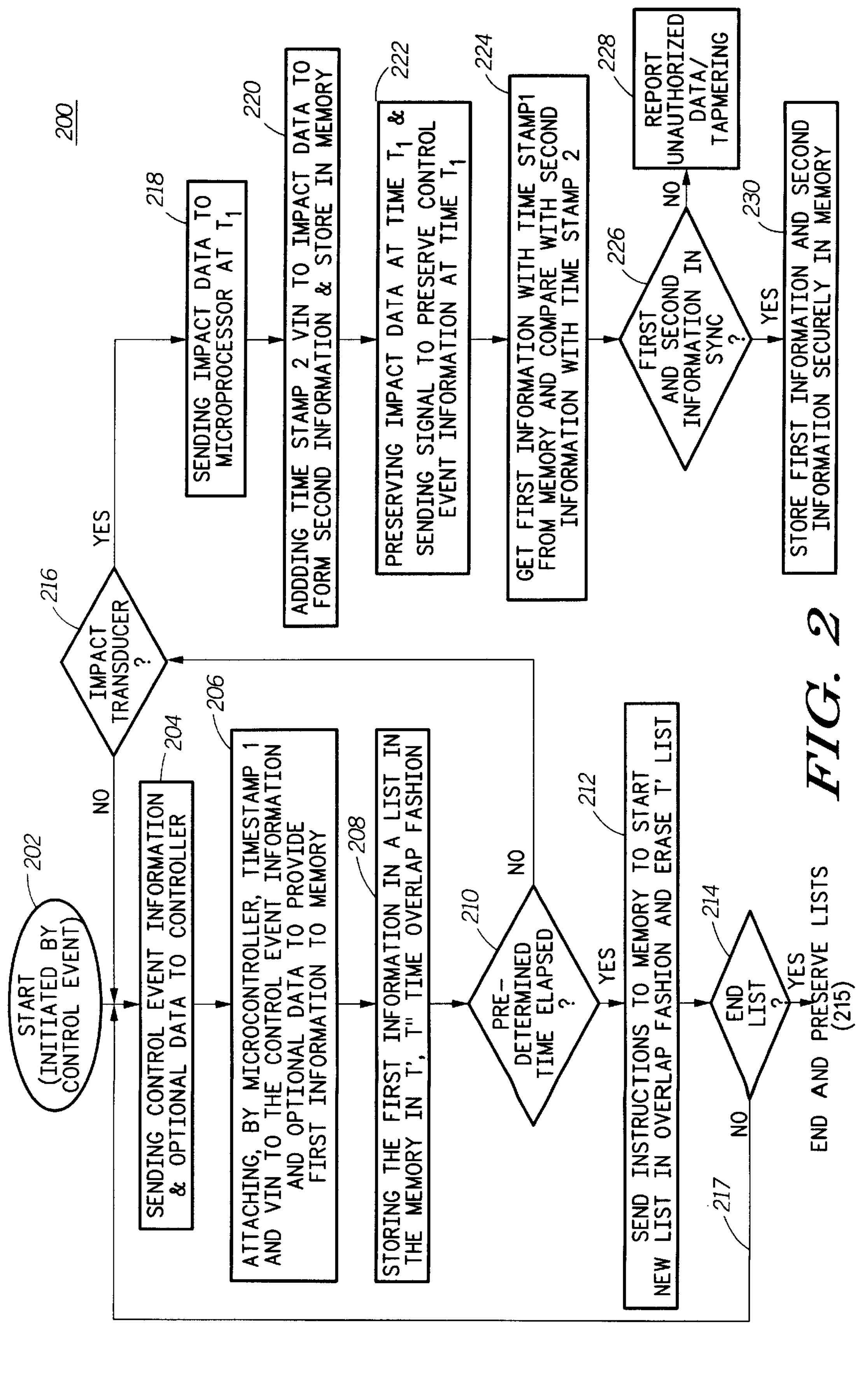
FIG. 2 is a flow chart of one embodiment of steps of a method for reliably storing control event data in a vehicle in accordance with the present invention.

FIG. 2, numeral 200, is a flow chart of one embodiment of steps of a method for reliably storing control event data in a vehicle in accordance with the present invention. The method includes the steps of: A) sending control event information and optional data to a microcontroller; B) attaching, by the microcontroller, a first time stamp and vehicle identification number VIN to the control event information and optional data to provide first information and sending the first information to a memory; C) storing the first information in a list in the memory in time overlap T', T'' fashion; D) determining whether a predetermined time has elapsed, and where the predetermined time is unelapsed, determining whether a transducer has encountered an impact; E) where the predetermined time has elapsed, sending instructions to the memory to start a new list in overlap fashion and erasing a T' list; F) determining whether to end the list; G) where the list is to be ended, ending and preserving the list; H) where the list fails to be ended, returning to step A; and I) where the transducer encounters an impact, sending impact data to a microprocessor at a time of impact, $T_i$; J) adding time stamp 2 and VIN to impact data to form second information and storing the second information in memory; K) preserving the first information and the second information at time $T_i$ the second information; L) comparing time stamp one of the first information with time stamp two of the second information; determining whether the first information is substantially synchronous with the second information within a predetermined range; M) where the first information is nonsynchronous with the second information, reporting unauthorized data tampering; and N) where the first information is synchronous with the second information, storing both the first information and the second information for authorized access at another time.

Control event information is generated as a result of actions by the driver. Control event information may include acceleration/deceleration information, braking information, hazard light initiation, air bag deployment, turn signal initiation, reverse gear implementation, parking gear initiation, hand brake initiation and the like. The VIN may be optional data sent to the microcontroller by the vehicle. Alternatively, the VIN number may already reside in the microcontroller. Other optional data may include, for example, a personal identification number that identifies the driver of the vehicle.

Storing first information in a list in memory in time overlap fashion means storing another list out of phase with the first list by a predetermined time.

Synchronicity of time stamp one and time stamp two may be determined by utilizing a preset value of time stamp in the microprocessor in a predetermined value so that the preselected synchronization difference is not known to an unauthorized person or device.

Figure 3:
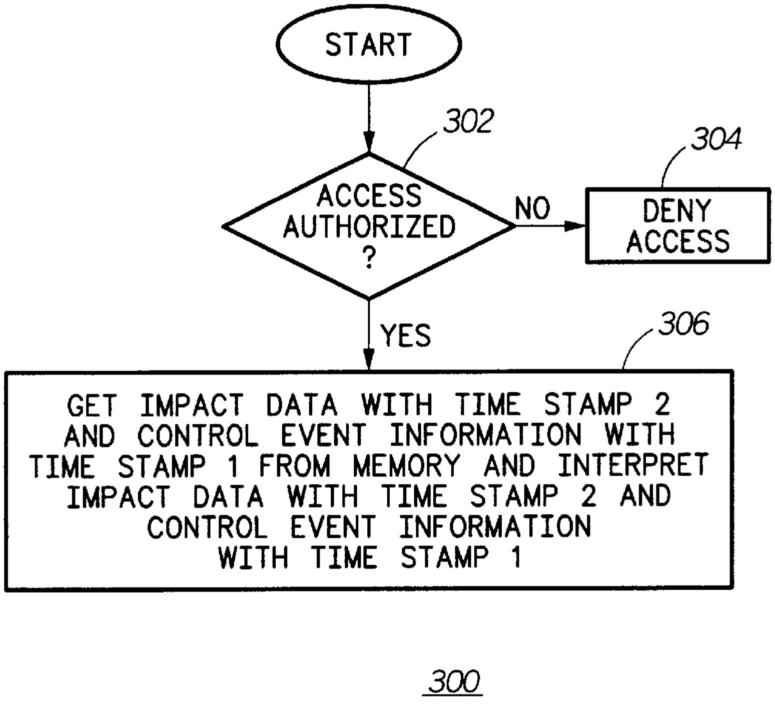
FIG. 3 is a flow chart of one embodiment of steps of a method for authenticating impact data and control event information in a vehicle in accordance with the present invention.

FIG. 3, numeral 300, is a flow chart of one embodiment of steps of a method for interpreting control event data and impact data in a vehicle in accordance with the present invention. The method includes the steps of: A) determining whether access is authorized to stored impact data with time stamp two and control event information and data with time stamp one in the vehicle; B) where access is unauthorized, denying access; C) where access is authorized, obtaining impact data with time stamp two and control event information and data with time stamp one and interpreting the impact data with time stamp two and control event information and data with time stamp one to provide an analysis of the accident.

Figure 4:
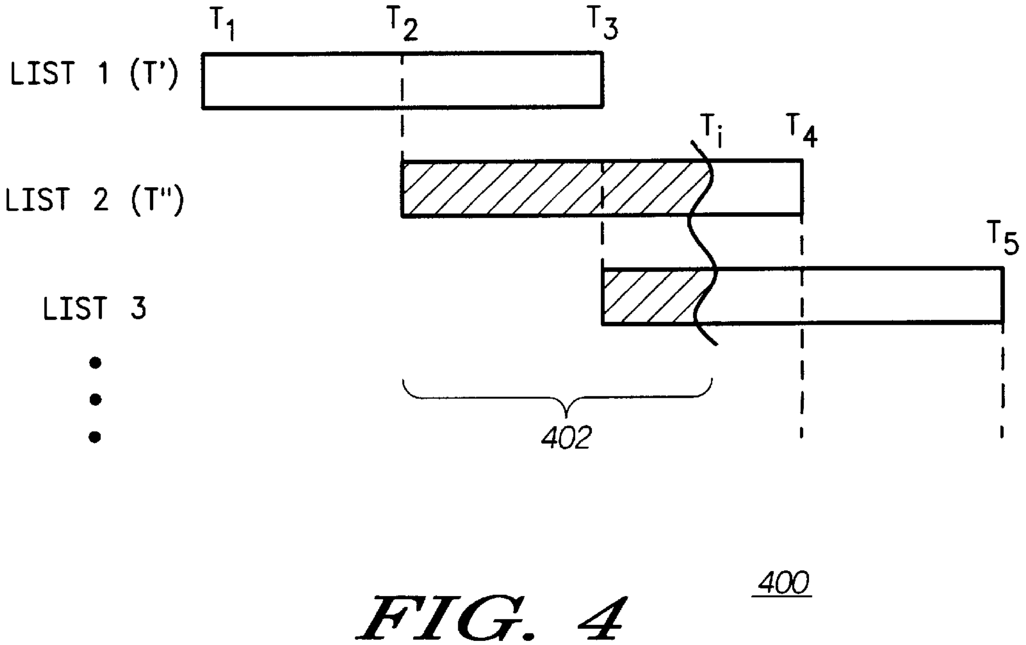
FIG. 4 is a flow chart of one embodiment of steps of a method for interpreting control event data and impact data in a vehicle in accordance with the present invention.

FIG. 4, numeral 400, is a schemmatic representation of a time line for generation and maintenance of control event information and optional data lists in the memory in accordance with the present invention. At time $T_1$, showing the start of an initial control event, a list—list 1—is started. After a predetermined interval, i.e., at time $T_2$, a second list is started. At time $T_3$, a third list is started, at which time the list 1 is erased. This process is repeated until control event information and data generation is ended as shown in FIG. 2. The predetermined interval is $(T_1, T_2)=(T_2,T_3)=(T_3, T_4)=$. . . . When control event information and data generation is ended, the control event information and data is preserved. For example, as shown in FIG. 4, when a transducer encounters an impact, the time is $T_i$. The data (402) between time $T_2$and $T_i$ in list 2 and data between $T_3$ and $T_i$ in list 3 is preserved and saved in memory. When the ignition is turned off, the data will be preserved and saved in a simlar fashion.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A device for authenticating and securing control event data for a vehicle, comprising:

A) a microcontroller, coupled to receive control event information, for attaching a first time stamp and vehicle identification number VIN to the control event information to provide first information and sending the first information to memory in time overlap fashion;

B) the memory, coupled to the microcontroller and a microprocessor, for storing first information and second information in time overlap fashion; and C) the microprocessor, coupled to the memory and a plurality of transducers, for determining whether received impact data varies from previous impact data, and where received impact data varies, adding a second time stamp and VIN to the received impact data to form second information.

2. The device of claim 1 wherein the device further includes an auto-lock unit coupled to the microprocessor for sending a signal to the memory to lock the first information and the second information in unchangeable form.

3. The device of claim 1 wherein the device further includes a manual lock for sending a signal to the memory to lock the first information and the second information in unchangeable form.

4. A method for authenticating and securing control event data for a vehicle, comprising the steps of:

A) sending control event information and data to a microcontroller;

B) attaching, by the microcontroller, a first time stamp and vehicle identification number to the control event information and data to provide first information and sending the first information to a memory;

C) storing the first information in a list in the memory in time overlap fashion;

D) determining whether one of: an ignition of a vehicle is in off position and a predetermined time has elapsed, and where one of: the ignition is on and the predetermined time is unelapsed, determining whether any other control event has occurred;

E) where another control event has occurred, returning to step A;

F) where another control event has failed to occur, ending;

G) where one of: the ignition is in an off position and the predetermined time has elapsed, sending instructions to the memory to start a new list in overlap fashion;

H) determining whether another control event has occurred;

I) where another control event has occurred, returning to step A; and

J) where another control event has failed to occur, ending.

5. A method for authenticating impact data and control event information in a vehicle, comprising the steps of:

upon transducers being impacted,

A) sending impact data to a microprocessor;

B) determining whether impact data varies and where impact data fails to vary, ending, and where impact data varies, adding a time stamp two and a vehicle identification number to the impact data to form second information and storing the second information in memory;

C) determining whether a manual lock is in use and:

where the manual lock is in use, using the manual lock to retain the second information unchanged in memory;

and where a manual lock fails to be in use, using an auto lock to retain the second information unchanged in memory;

D) obtaining first information on control events and data and comparing with second information;

E) determining whether the first information and the second information is synchronized;

F) where the first information and the second information fails to be synchronized, reporting unauthenticated data/tampering; and G) where the first information and second information is synchronized, storing the first information and the second information in memory.

6. A method for interpreting control event data and impact data in a vehicle to provide an analysis of an accident, comprising the steps of:

A) determining whether access is authorized to stored impact data with time stamp two and control event information and data with time stamp one in the vehicle;

B) where access is unauthorized, denying access;

C) where access is authorized, obtaining impact data with time stamp two and control event information and data with time stamp one and interpreting the impact data with time stamp two and control event information and data with time stamp one to provide an analysis of the accident.

* * * * *